3,298,845
CYANOETHYLATED HYDROXYALKYLSUCROSE
AND ITS PREPARATION
George P. Touey and Herman E. Davis, Kingsport, Tenn., assignors to Eastman Kodak Company, Rochester, N.Y., a corporation of New Jersey
No Drawing. Original application Dec. 6, 1962, Ser. No. 242,597, now Patent No. 3,222,358, dated Dec. 7, 1965. Divided and this application June 28, 1965, Ser. No. 478,004
7 Claims. (Cl. 106—169)

This invention relates to cyanoethyl ethers of hydroxyalkylated sugars. In particular, it relates to water-insoluble substantially completely cyanoethylated ethers of hydroxyalkylated sucrose derivatives. This is a division of S.N. 242,597, filed December 6, 1962 and now U.S. Patent 3,222,358.

In our earlier application 805,730, now U.S. Patent 3,068,220, issued December 11, 1962, of which this application is a continuation-in-part, we have shown that a substantially completely cyanoethylated sucrose was a new sugar derivative containing valuable properties. For example, the nonvolatile, viscous liquid was soluble in certain cellulose esters and could function both as a plasticizer and a plasticizer extender for these materials. In application 109,263, now U.S. Patent 3,161,539, issued December 16, 1964, we have shown that a highly cyanoethylated sucrose had a very valuable and unique property. It possessed a very high dielectric constant which gave it potential commercial value as an impregnant for paper used in the manufacture of electrical capacitors or as one of the components of electroluminescent cells. It also imparted a high dielectric constant to certain films and plastics to which it was added. This was in addition to its functioning as a plasticizer or extender for these materials. Thus, a substantially completely cyanoethylated sucrose is a new and useful sucrose derivative.

Although cyanoethylated sucrose, as described in the above mentioned applications, has some commercially attractive properties, it has certain disadvantages. One of these is its extremely high viscosity which, obviously, is a drawback in any process wherein wrappings of paper or any other material must be impregnated with the liquid in the absence of an organic solvent diluent. For example, at room temperature it is a nonpourable semisolid with a viscosity so high that it is not measurable. Even at 50° C. its viscosity is still high, being above 20,000 cps. as shown by the Eastman Technical Data Sheet No. X-132. In fact it is not a fluid material until it has been heated to over 100° C. Another disadvantage is its limited solubility in other organic materials. For example, it is highly soluble in commercial cellulose acetates and films of this material containing up to 50% of the cyanoethylsucrose can be prepared. However, it is only sparingly soluble in films of commercial vinyl polymers and copolymers such as poly(vinyl acetate), poly(ethyl acrylate), poly(methyl methacrylate), copolymers of vinyl chloride and vinyl acetate, etc.

An object of this invention is to disclose a new composition of matter, a substantially completely cyanoethylated hydroxyalkyl ether of sucrose. Another object is to disclose a new composition of matter, a substantially completely cyanoethylated hydroxyethyl ether of sucrose. A third object is to disclose a new composition of matter, a substantially completely cyanoethylated hydroxypropyl ether of sucrose. A fourth object to disclose a substantially completely cyanoethylated sucrose derivative which has utility as a plasticizer or extender for various organic film forming and plastic forming materials. A fifth object is to disclose a substantially completely cyanoethylated sucrose derivative which like cyanoethylsucrose, has a high dielectric constant but unlike cyanoethylsucrose is pourable at room temperature and highly compatible with a wide variety of organic materials.

These objects are accomplished by reacting a condensation product of sucrose and a low-molecular-weight alkylene oxide with acrylonitrile and in the presence of an alkaline catalyst until substantially all of the hydroxyl groups on the condensation product have been converted to cyanoethyl ether groups:

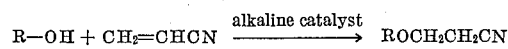

The alkylene oxide-sucrose condensation product which is the starting material for this reaction can be either a monomeric or polymeric condensation product as illustrated by the following equations, wherein ethylene oxide is the alkylene oxide used. In these equations sucrose is represented by $R(CHOH)_3$ merely for convenience. It is understood that the R grouping represents the remainder of the sucrose molecule including the five other hydroxyl groups which can react in a similar manner:

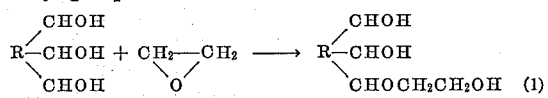

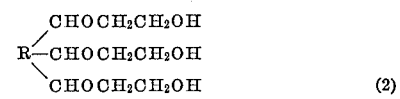

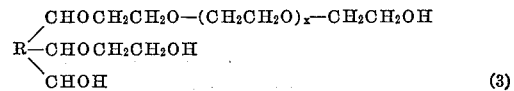

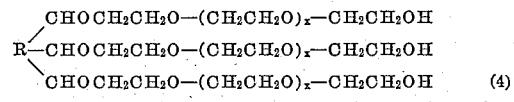

Formulas 1 and 2 illustrate monomeric condensation products, wherein either part or all of the available hydroxyl groups on the sucrose have condensed with the alkylene oxide to produce monomeric hydroxyalkyl substituent groups. Formula 3 illustrates the case where a mixture of polymeric, monomeric, and unreacted hydroxyl groups are obtained, the polymeric group originating from the reaction of more ethylene oxide with a preformed monomeric hydroxyalkyl substituent:

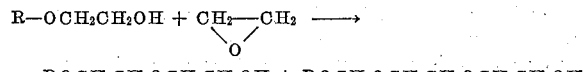

etc. Formula 4 illustrates that it is also possible to produce a compound wherein all of the preformed hydroxyalkyl substituent groups on the sugar have further reacted with alkylene oxide to give polymeric substituent groups. It is obvious, therefore, that by the reaction of an alkylene oxide with sucrose one can obtain a mixture of compounds but in every case the number of hydroxyl groups available for subsequent reaction with acrylonitrile are 8 just as in the case with sucrose itself. This fact is important since the degree of cyanoethylation, and therefore the dielectric properties of the product, are due to the presence of the cyanoethyl groups.

The preferred alkylene oxide-sucrose condensation intermediates for the cyanoethylation reaction are those from ethylene oxide, propylene oxide or butylene oxide. Also, the amount of polymeric condensation products should be kept to a minimum so that the water solubility of the final cyanoethylated product will be negligible. The ideal sucrose intermediate products for the cyanoethylation reaction are those substantially monomeric hydroxyethyl and hydroxypropyl ethers of sucrose wherein at least 3 and preferably all of the hydroxyl groups on the sucrose have been etherified with the alkylene oxide. An example of such a product is the octa-substituted hydroxypropylsucrose described in U.S. Patent 2,927,918 and known to the trade as Hyprose SP80 or octakis-(2-hydroxypropylsucrose).

The hydroxyalkylsucrose ethers can be cyanoethylated by any convenient means known to the art to give the substantially completely cyanoethylated products of this invention. One convenient method has been disclosed in our application 805,730. It involves the treatment of an aqueous alkaline (NaOH) solution of the intermediate sucrose derivative with a slight excess of acrylonitrile at slightly elevated temperatures followed by isolation of the product. This procedure is illustrated in more detail in Example 1 of this application. Another method is to dissolve the hydroxyalkylated sucrose in an organic solvent (inert to acrylonitrile) containing a slight excess of acrylonitrile and a strong alkaline catalyst such as the alkali hydroxides or the tetraalkylammonium hydroxides. Also, since the more highly substituted hydroxyalkylsucrose starting materials are soluble in acrylonitrile it is possible to eliminate the use of water or an inert organic solvent for the reaction. It is also possible to prepare the hydroxyalkylsucrose intermediate in situ and then proceed with the cyanoethylation reaction without ever isolating the intermediate. However, the manner of making the derivative is not important as long as a substantially completely cyanoethylated final product is obtained. The preferred method for cyanoethylating the intermediate is the one given in our U.S. application 805,730.

Example 1

Ten parts of potassium hydroxide, dissolved in 23 parts of water, were added to 205 parts (0.25 mole) of octakis-(2-hydroxypropylsucrose) prepared according to Example 1 of U.S. Patent 2,927,918. Acrylonitrile, 111 parts (2.1 moles) was added over a period of one hour. During the addition of the acrylonitrile, the reaction vessel was cooled sufficiently to hold the reaction temperature between 40 and 45° C. After the addition of the acrylonitrile was completed, the reaction mixture was agitated an additional 30 minutes at 45° C. The product was diluted with 300 parts of dichloromethane and washed eight times with distilled water. The methylene chloride was then removed from the product by distillation. 289 parts of a viscous liquid containing 8.7% nitrogen were obtained. (Calculated nitrogen for a completely cyanoethylated product is 9.1%.)

The cyanoethylated hydroxypropylsucrose had a volume resistivity of $1.4 \times 10^9$ ohm centimeters at 27° C. and a dielectric constant of 33. It was pourable at room temperature; at 50° C. its viscosity was below 1,500 cps.

Films of a number of polymer materials containing 10%, 20%, and 30% of the cyanoethylated product were prepared and rated for compatibility. The results of these tests were compared with those carried out with a substantially completely cyanoethylated sucrose as shown below.

FILMS OF POLYMERIC MATERIALS CONTAINING CYANOETHYL-SUCROSE OR CYANOETHYLATED HYDROXYPROPYLSUCROSE

| Film | | Compatibility of C.E.S. | | | Compatibility of H.P.C.E.S. | | |
|---|---|---|---|---|---|---|---|
| | | 10% | 20% | 30% | 10% | 20% | 30% |
| (1) | Cellulose triacetate | C | C | C | C | C | C |
| (2) | Cellulose tributyrate | C | I | I | C | C | C |
| (3) | Poly(vinyl acetate) | C | I | I | C | C | C |
| (4) | Poly(methyl methacrylate) | C | I | I | C | C | C |
| (5) | 90/10 Vinyl chloride-vinyl acetate copolymers | I | I | I | C | C | I |
| (6) | Poly(vinyl butyral) | I | I | I | C | C | I |

C=Compatible (did not make a hazy film or did not exude to the surface of the film on storage one week at 25° C.).

I=Incompatible (formed a hazy or opaque film or exuded to the surface of the film on storage one week at 25° C.).

C.E.S.=Cyanoethylsucrose as prepared according to Application 805,730.

H.P.C.E.S.=Hydroxypropyl-cyanoethylsucrose as prepared according to this example.

Example 2

A mixture of monomeric and polymeric hydroxyethylsucrose was prepared by dissolving 171 g. (0.5 mole) of sucrose in 300 ml. dimethylformamide, adding 8 moles of ethylene oxide and 5 g. of tetramethylammonium hydroxide, and stirring the mixture for 24 hours at room temperature. After all of the excess ethylene oxide, catalyst and solvent was removed from the mixture it was cyanoethylated with an excess of acrylonitrile and the cyanoethylated product was isolated and purified as described in Example 1. It contained 11% nitrogen and only a trace of unreacted hydroxyl groups. The product was readily pourable at 25° C. and was an excellent plasticizer for commercial grades of cellulose acetate butyrate, cellulose tributyrate, and poly(vinyl acetate). It showed no signs of exudation from films of these polymers after one week at 25° C. even though the films contained 40% of the cyanoethylated product.

We claim:

1. A composition of matter comprising (a) a polymeric material selected from a group consisting of a lower fatty acid ester of cellulose, poly (vinyl acetate), poly (methyl methacrylate), poly (vinyl butyral), a vinyl chloride-vinyl acetate copolymer and (b) cyanoethyl hydroxyalkyl sucrose in which substantially all of the hydroxyl groups have been replaced with cyanoethyl groups.

2. A composition of matter comprising a lower fatty acid ester of cellulose and cyanoethyl hydroxyalkyl sucrose in which substantially all of the hydroxyl groups have been replaced with cyanoethyl groups.

3. A composition of matter according to claim 2 wherein said lower fatty acid ester of cellulose is cellulose tributyrate.

4. A composition of matter according to claim 2 wherein said lower fatty acid ester of cellulose is cellulose acetate butyrate.

5. A composition of matter according to claim 1 wherein said polymeric material is poly(vinyl acetate).

6. A composition of matter according to claim 1 wherein said polymeric material is a vinyl chloride-vinyl acetate copolymer.

7. A composition of matter according to claim 1 wherein said polymeric material is poly(vinyl butyral).

References Cited by the Examiner

UNITED STATES PATENTS 3,161,539   12/1964   Touey et al. _____ 117—143

ALEXANDER H. BRODMERKEL, *Primary Examiner.*

J. H. WOO, *Assistant Examiner.*